United States Patent
Heckel et al.

(10) Patent No.: US 10,860,442 B2
(45) Date of Patent: Dec. 8, 2020

(54) SYSTEMS, METHODS AND COMPUTER READABLE MEDIA FOR BUSINESS CONTINUITY AND DISASTER RECOVERY (BCDR)

(71) Applicant: Datto, Inc., Norwalk, CT (US)

(72) Inventors: Philipp Heckel, Ladenburg (DE); Austin McChord, Norwalk, CT (US)

(73) Assignee: DATTO, INC., Norwalk, CT (US)

( * ) Notice: Subject to any disclaimer, the term of this patent is extended or adjusted under 35 U.S.C. 154(b) by 140 days.

(21) Appl. No.: 15/996,103

(22) Filed: Jun. 1, 2018

(65) Prior Publication Data

US 2019/0370123 A1  Dec. 5, 2019

(51) Int. Cl.
*G06F 11/07* (2006.01)
*G06F 11/14* (2006.01)

(52) U.S. Cl.
CPC ...... *G06F 11/1469* (2013.01); *G06F 11/1451* (2013.01); *G06F 11/1466* (2013.01); *G06F 11/1484* (2013.01)

(58) Field of Classification Search
CPC .......... G06F 11/1458; G06F 11/1466; G06F 11/1469
USPC .................................. 714/4.11, 6.3
See application file for complete search history.

(56) References Cited

U.S. PATENT DOCUMENTS

| | | | |
|---|---|---|---|
| 7,353,355 B1 | 4/2008 | Tormasov et al. | |
| 8,261,126 B2 | 9/2012 | Sosnosky et al. | |
| 8,332,689 B2 | 12/2012 | Timashev et al. | |
| 8,468,387 B2 | 6/2013 | Sosnosky et al. | |
| 8,645,748 B1 | 2/2014 | Chepel et al. | |
| 10,031,690 B1* | 7/2018 | Panidis | G06F 3/0619 |
| 2012/0272021 A1* | 10/2012 | Okada | G06F 3/0605 711/162 |
| 2014/0108350 A1* | 4/2014 | Marsden | G06F 3/0647 707/639 |
| 2015/0278032 A1 | 10/2015 | Shvechkov et al. | |
| 2015/0347548 A1 | 12/2015 | Mortensen et al. | |
| 2016/0041880 A1* | 2/2016 | Mitkar | H04L 67/1095 707/680 |
| 2016/0277271 A1* | 9/2016 | Wang | H04L 43/0817 |
| 2016/0371007 A1* | 12/2016 | Shani | G06F 3/067 |

(Continued)

OTHER PUBLICATIONS

Desorcie, "Fast Failback," Datto Knowledge Base, Last Updated: Apr. 19, 2018, 5 pages, retrieved online at <https://kb.datto.com/hc/en-us/articles/115002620263-Fast-Failback>.

(Continued)

*Primary Examiner* — Chae M Ko
(74) *Attorney, Agent, or Firm* — Fay Sharpe LLP

(57) ABSTRACT

Disclosed systems, methods, and computer readable media relate to business continuity and disaster recovery (BCDR). According to some embodiments, disclosed systems, methods, and computer readable media can replicate a set of data blocks from a source computer to a target computer while the source computer is in operation and contents of the set of data blocks are changing. In some embodiments, disclosed systems, methods, and computer readable media can replicate a set of data blocks from a recovery computer to a target computer while the recovery computer is in operation and contents of the set of data blocks are changing, wherein the recovery computer is built from a protected computer.

19 Claims, 8 Drawing Sheets

(56) References Cited

U.S. PATENT DOCUMENTS

2017/0083540 A1* 3/2017 Mamluk ............. G06F 11/1471
2017/0300232 A1* 10/2017 Dewey .................. G06F 3/0605
2018/0165339 A1* 6/2018 Goldmann .............. G06F 16/27
2019/0163581 A1* 5/2019 Sadavarte ........... G06F 11/1469

OTHER PUBLICATIONS

Desorcie, "Restore: Create Rescue Agent," Datto Knowledge Base, Last Updated: Apr. 19, 2018, 10 pages, retrieved online at <https://kb.datto.com/hc/en-us/articles/115002351766-Restore-Create-Rescue-Agent>.
Nordquist, "Bare Metal Restore Tips and Tricks," 5 pages, © 2018 StorageCraft Technology Corporation, retieved online at <https://blog.storagecraft.com/bare-metal-restore-tips-tricks/>.

* cited by examiner

SYSTEMS, METHODS AND COMPUTER READABLE MEDIA FOR BUSINESS CONTINUITY AND DISASTER RECOVERY (BCDR)

BACKGROUND OF THE INVENTION

Technical Field

Embodiments of the present disclosure relate to systems, methods, and computer readable media for business continuity and disaster recovery (BCDR).

Description of the Related Art

Computer systems are vulnerable to failures due to various risks, including unforeseen risks. These risks can arise from system disasters, natural disasters, and/or human error disasters. For example, system disasters related to hardware issues (e.g., memory defects, hard drive failures) and software issues (e.g., virus infections, malware, spear phishing, denial of service) can cause computer systems to malfunction. As another example, natural disasters, such as a fire, a flood, or an earthquake, can destroy computer systems. Yet in another example, human error disasters can cause data to be accidentally deleted. Moreover, computer systems can be lost due to theft. These disasters can result in computer system crashes and physical damages, both of which can be irreversible.

Many computer users, including home users and business users, rely on their computer systems for their day-to-day activities. Any disaster, small or big, can negatively impact these computer users. For example, a disaster to a mission critical business computer system can cause a downtime to the business, resulting in a loss of revenue and customers. If data is lost during a computer system failure, the computer user would need to spend resources to reconstruct the lost data. In many cases, it may not even be possible to reconstruct the lost data. Thus, any type of disaster to computer system can adversely affect operation data of businesses and personal data of home users.

To minimize the impact from a computer system failure, a user can implement a business continuity and disaster recovery (BCDR) system. The BCDR system typically includes a backup system that regularly backs up data in the computer system's hard drives. The traditional BCDR system can be complex and costly because the backup data can be difficult to manage, and the backup system can use a significant amount of computer resources. Thus, it is desirable to have an improved BCDR system.

SUMMARY

In accordance with the disclosed subject matter, systems, methods, and computer readable media are provided for business continuity and disaster recovery (BCDR).

Before explaining example embodiments consistent with the present disclosure in detail, it is to be understood that the disclosure is not limited in its application to the details of constructions and to the arrangements set forth in the following description or illustrated in the drawings. The disclosure is capable of embodiments in addition to those described and is capable of being practiced and carried out in various ways. Also, it is to be understood that the phraseology and terminology employed herein, as well as in the abstract, are for the purpose of description and should not be regarded as limiting.

According to some embodiments, a method can relate to replicating a set of data blocks from a source computer to a target computer while the source computer is in operation and contents of the set of data blocks are changing. The method can include capturing a first crash-consistent snapshot of the source computer that performs computer functions. The first crash-consistent snapshot can include contents of the set of data blocks at the source computer at a first point in time. The contents at the first point in time can include data that implements an operating system running on the source computer at the first point in time and files that are stored on the source computer at the first point in time. The method can also include issuing an instruction to build the target computer based on the first crash-consistent snapshot such that the target computer is prepared to take over the computer functions of the source computer and replicate an operating state of the source computer at the first point in time. The method can also include capturing a second crash-consistent snapshot of the source computer. The second crash-consistent snapshot can include contents of the set of data blocks at the source computer at a second point in time. The contents at the second point in time can include data that implements an operating system running on the source computer at the second point in time and files that are stored on the source computer at the second point in time. The method can also include incrementally updating the target computer by: computing a first data difference between the first crash-consistent snapshot and the second crash-consistent snapshot; and when the first data difference is not null, issuing one or more first additional instructions, based on the first data difference, to the target computer to prepare the target computer to replicate the operating state of the source computer at the second point in time and to take over the computer functions of the source computer. The method can also include upon issuing an instruction, to the target computer, to perform the computer functions of the source computer, capturing a finalization snapshot of the source computer. The finalization snapshot can include contents of the set of data blocks at the source computer at a last point in time. The contents at the last point in time can include data that implements an operating system running on the source computer at the last point in time and files that are stored on the source computer at the last point in time. The method can also include computing a last data difference between a most recent crash-consistent snapshot and the finalization snapshot. The method can also include issuing one or more final additional instructions, based on the last data difference, to the target computer to prepare the target computer to replicate the operating state of the source computer at the last point in time and to take over the computer functions of the source computer.

According to some embodiments, the source computer can be a recovery computer. The method can further include before capturing the first crash-consistent snapshot of the source computer, (1) capturing a snapshot of a protected computer; and (2) provisioning the source computer based on the snapshot of the protected computer.

According to some embodiments, the snapshot of the protected computer can be a finalization snapshot.

According to some embodiments, the protected computer can be a physical machine and the source computer can be a virtual machine (VM).

According to some embodiments, provisioning the source computer can be based on at least one of a suspected malfunction, decommission, upgrade, and maintenance process of the protected computer.

According to some embodiments, one or more other crash-consistent snapshots of the source computer can be captured between the second point in time and the last point in time.

According to some embodiments, the first crash-consistent snapshot and the second crash-consistent snapshot can be stored in a Z File System (ZFS) chain.

According to some embodiments, the one or more first additional instructions can include one or more write commands corresponding to the first data difference for the target computer. In some embodiments, the one or more write commands can be applied to the target computer.

According to some embodiments, the method can further include executing, at the source computer, the one or more write commands on a file system of the target computer that is mounted at the source computer.

According to some embodiments, the first crash-consistent snapshot can be the most recent crash-consistent snapshot of the source computer when the instruction to build the target computer is issued based on the first crash-consistent snapshot.

According to some embodiments, the second crash-consistent snapshot can be the most recent crash-consistent snapshot of the source computer when the first data difference between the first crash-consistent snapshot and the second crash-consistent snapshot is computed.

According to some embodiments, the second crash-consistent snapshot can be the most recent crash-consistent snapshot of the source computer.

According to some embodiments, the source computer can be at least one of a physical machine and a virtual machine (VM).

According to some embodiments, the computer functions can be provided for at least one client computer.

According to some embodiments, the instruction to the target computer to perform the computer functions of the source computer can be issued based on at least one of a user-initiated event and a computer-initiated event.

According to some embodiments, when the target computer performs the computer functions of the source computer, the target computer can overtake a time-incremental schedule that is used by the source computer to capture one or more crash-consistent snapshots.

According to some embodiments, the operating system can include a file system.

According to some embodiments, upon receiving the instruction to perform the computer functions of the source computer, the target computer can perform synchronizing the file system of the target computer with the file system of the source computer; rebooting; and/or testing the target computer to verify at least one of functionality and data integrity.

According to some embodiments, the method can further include deprovisioning the target computer after verifying the at least one of functionality and data integrity of the target computer.

According to some embodiments, the method can further include determining whether the source computer is operating within desired parameters. In some embodiments, the instruction to build the target computer based on the first crash-consistent snapshot can be issued when the source computer is determined to not be operating within the desired parameters.

According to some embodiments, the method can further include maintaining, after the target computer is instructed to perform the computer functions of the source computer, operation of the source computer. In some embodiments, the source computer can continue to take one or more crash-consistent snapshots into a first plurality of crash-consistent snapshots, while the target computer can take one or more crash-consistent snapshots into a second plurality of snapshots.

According to some embodiments, the first plurality of snapshots can be a first Z File System (ZFS) chain of snapshots, and the second plurality of snapshots can be a second ZFS chain of snapshots.

According to some embodiments, the finalization snapshot can be captured while the source computer is quiesced. In some embodiments, the first crash-consistent snapshot and the second crash-consistent snapshot can both be taken while the source computer is not quiesced.

According to some embodiments, a method can relate to replicating a set of data blocks from a recovery computer to a target computer while the recovery computer is in operation and contents of the set of data blocks are changing, wherein the recovery computer is built from a protected computer. The method can include capturing a snapshot of the protected computer. The method can also include provisioning the recovery computer based on the snapshot of the protected computer. The method can also include capturing a first snapshot of the recovery computer that performs computer functions. The first snapshot can include contents of the set of data blocks at the recovery computer at a first point in time. The contents at the first point in time can include data that implements an operating system running on the recovery computer at the first point in time and files that are stored on the recovery computer at the first point in time. The method can also include issuing an instruction to build the target computer based on the first snapshot such that the target computer is prepared to take over the computer functions of the recovery computer and replicate an operating state of the recovery computer at the first point in time. The method can also include capturing a second snapshot of the recovery computer. The second snapshot can include contents of the set of data blocks at the recovery computer at a second point in time. The contents at the second point in time can include data that implements an operating system running on the recovery computer at the second point in time and files that are stored on the recovery computer at the second point in time. A plurality of snapshots of the recovery computer, including the first snapshot and the second snapshot, can be captured based on a time-incremental schedule of the recovery computer that is based on a time-incremental schedule of the protected computer. The method can also include incrementally updating the target computer by: computing a data difference between the first snapshot and the second snapshot; and when the data difference is not null, issuing one or more additional instructions, based on the data difference, to the target computer to prepare the target computer to replicate the operating state of the recovery computer at the second point in time and to take over the computer functions of the recovery computer. The method can also include issuing an instruction, to the target computer, to perform the computer functions of the recovery computer. The target computer, upon receiving the instruction to perform the computer functions of the recovery computer, can synchronize a file system of the target computer with a file system of the recovery computer and reboot.

According to some embodiments, the method can further include capturing a third snapshot of the recovery computer. The third snapshot can include contents of the set of data blocks at the recovery computer at a third point in time. The contents at the third point in time can include data that implements an operating system running on the recovery computer at the third point in time and files that are stored on the recovery computer at the third point in time.

The method can also include before issuing the instruction to the target computer to perform the computer functions of the recovery computer, further incrementally updating the target computer by: computing a second data difference between the second snapshot and the third snapshot; and when the second data difference is not null, issuing one or more additional instructions, based on the second data difference, to the target computer to prepare the target computer to take over the computer functions of the recovery computer and to replicate the operating state of the recovery computer at the third point in time.

According to some embodiments, the first snapshot and the second snapshot can be stored in a Z File System (ZFS) chain.

According to some embodiments, the one or more additional instructions based on the data difference can include one or more write commands corresponding to the data difference between the first snapshot and the second snapshot for the target computer. In some embodiments, the one or more write commands can be applied to the target computer.

According to some embodiments, the method can further include executing, at the recovery computer, the one or more write commands on a file system of the target computer that is mounted at the recovery computer.

According to some embodiments, the first snapshot can be a most recent snapshot of the recovery computer when the instruction to build the target computer is issued based on the first snapshot.

According to some embodiments, the second snapshot can be a most recent snapshot of the recovery computer when the data difference between the first snapshot and the second snapshot is computed.

According to some embodiments, the recovery computer can be at least one of a physical machine and a virtual machine (VM).

According to some embodiments, the computer functions can be provided for at least one client computer.

According to some embodiments, the instruction to the target computer to perform the computer functions of the recovery computer can be issued based on at least one of a user-initiated event and a computer-initiated event.

According to some embodiments, when the target computer performs the computer functions of the recovery computer, the target computer can overtake the time-incremental schedule of the recovery computer to capture one or more snapshots of the target computer.

According to some embodiments, the protected computer can be a physical machine and the recovery computer can be a virtual machine (VM).

According to some embodiments, provisioning the recovery computer can be based on at least one of a suspected malfunction, decommission, upgrade, test, and maintenance process of the protected computer.

According to some embodiments, the operating system can include a file system.

According to some embodiments, the target computer, after synchronizing the file system of the target computer with the file system of the recovery computer and rebooting, can be tested to verify at least one of functionality and data integrity.

According to some embodiments, the method can further include deprovisioning the target computer after verifying the at least one of functionality and data integrity of the target computer.

According to some embodiments, the method can further include determining whether the recovery computer is operating within desired parameters. The instruction to build the target computer based on the first snapshot can be issued when the recovery computer is determined to not be operating within the desired parameters.

According to some embodiments, the method can further include maintaining, after the target computer is instructed to perform the computer functions of the recovery computer, operation of the recovery computer. The recovery computer can continue to take one or more snapshots into a first plurality of snapshots, while the target computer takes one or more snapshots into a second plurality of snapshots.

According to some embodiments, the first plurality of snapshots can be a first Z File System (ZFS) chain of snapshots, and the second plurality of snapshots can be a second ZFS chain of snapshots.

According to some embodiments, the method can further include maintaining, after the target computer is instructed to perform the computer functions of the recovery computer, operation of the protected computer. The protected computer can continue to take one or more snapshots into a first plurality of snapshots, while the target computer takes one or more snapshots into a second plurality of snapshots.

According to some embodiments, the first plurality of snapshots can be a first Z File System (ZFS) chain of snapshots, and the second plurality of snapshots can be a second ZFS chain of snapshots.

According to some embodiments, the target computer can be a repaired version of the protected computer.

BRIEF DESCRIPTION OF THE DRAWINGS

While multiple embodiments are disclosed, still other embodiments of the present disclosure will become apparent to those skilled in the art from the following detailed description, which shows and describes illustrative embodiments of the disclosure. Accordingly, the drawings and detailed description are to be regarded as illustrative in nature and not restrictive.

DETAILED DESCRIPTION

Figure 1A:
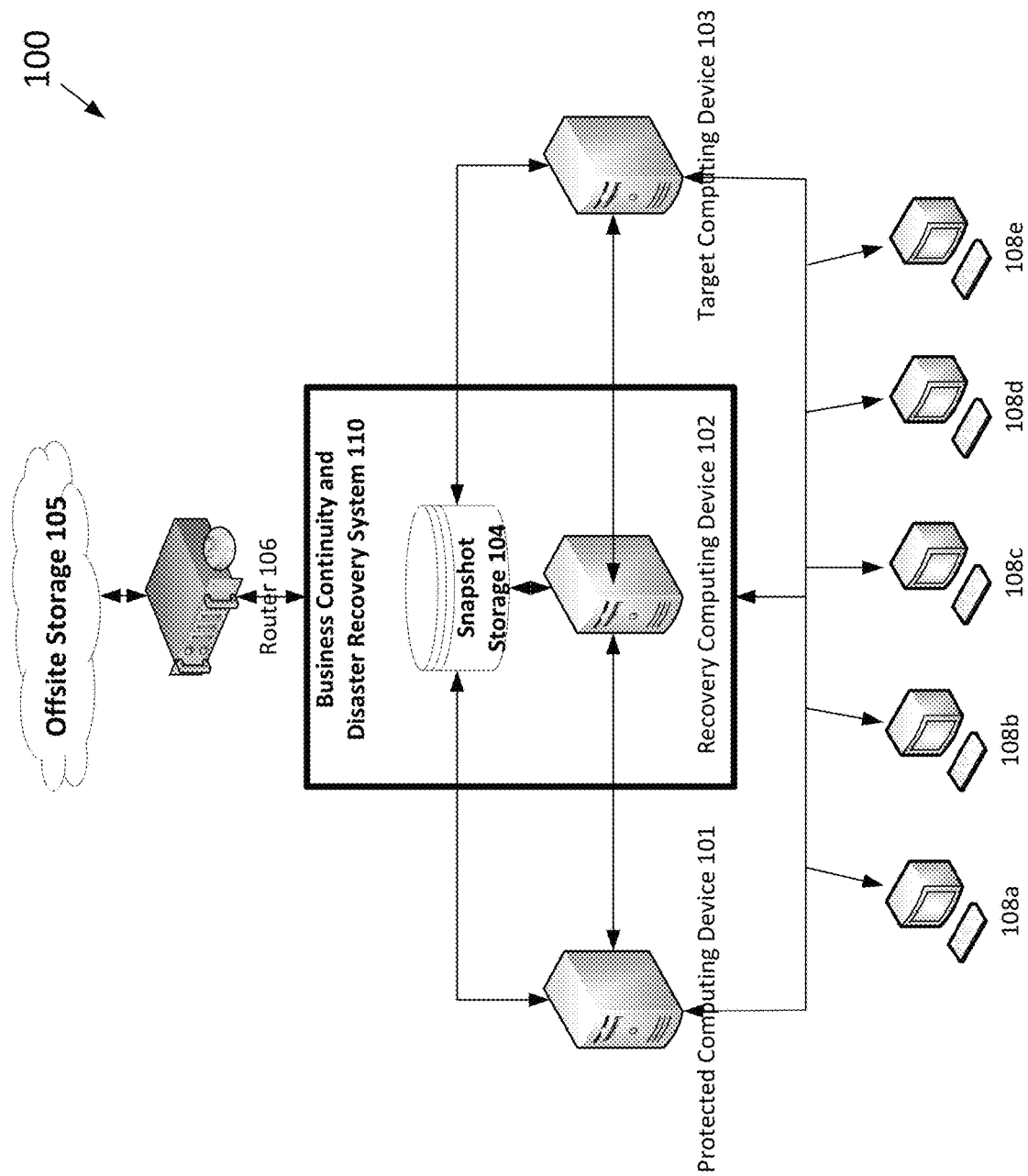
FIG. 1A shows a block diagram illustrating example aspects of a system in accordance with embodiments of the present disclosure.

In the following description, numerous specific details are set forth regarding the systems, methods, and media of the disclosed subject matter and the environment in which such systems, methods, and media may operate, etc., in order to provide a thorough understanding of the disclosed subject matter. It will be apparent to one skilled in the art, however, that the disclosed subject matter may be practiced without such specific details, and that certain features, which are well known in the art, are not described in detail in order to avoid complication of the disclosed subject matter. In addition, it will be understood that the examples provided below are exemplary, and that it is contemplated that there are other systems, methods and media that are within the scope of the disclosed subject matter.

Disclosed systems, methods, and computer readable media can be used as part of a business continuity and disaster recovery (BCDR) system. In some embodiments, the BCDR system can perform bare-metal restore (BMR) of a computer system. For example, a protected computing device can be restored to a new computing device (e.g., a target computing device) from bare metal (i.e., the new machine does not require any previously installed operating system or other software), when the protected computing device malfunctions.

According to some embodiments, the data on a protected computing device can be backed up by capturing one or more snapshots at various times. A snapshot can represent the state of the protected computing device at a particular time. In some embodiments, the snapshot can be a file-based snapshot. In other embodiments, the snapshot can be a block-based snapshot. In some embodiments, the snapshot can be captured by a software agent running on a computing device, such as an agent running on a protected computing device. In some embodiments, the snapshot can be captured by an operating system and/or a virtual operating platform, such as a hypervisor acquiring a snapshot of the state of a virtual machine. While the present disclosure intends to cover all embodiments of snapshot acquiring mechanisms, to aid in clarity of the description, the present disclosure may simply describe that the snapshot is acquired by the device. Based on one of these snapshots, the disclosed BCDR system can provision a recovery computing device. The recovery computing device can be provisioned in response to a user-initiated event (e.g., the user manually requesting the recovery computing device to be provisioned) and/or a system-initiated event (e.g., instability detected in the protected computing device, or the protected computing device crashes).

According to some embodiments, the recovery computing device can take over the computer functions of the protected computing device. The recovery computing device can also start backing up the data on the recovery computing device by capturing one or more snapshots. The recovery computing device can take some or all of the backup configurations of the protected computing device, such as the backup schedule. While the recovery computing device is performing the computer functions and backing up data, the disclosed BCDR system can provision a target computing device based on a snapshot of the recovery computing device (e.g., the most recent snapshot of the recovery computing device at the time of provisioning the target computing device).

Once building the target computing device based on a snapshot of the recovery computing device has commenced, the target computing device can be incrementally updated with any future changes at the recovery computing device. In other words, the changes between different snapshots of the recovery computing device are applied to the target computing device in a trickling manner. Thus, as new snapshots are created on the recovery computing device, the target computing device can be incrementally updated by adding, deleting, and/or modifying data blocks representing files or portions of files. For example, instead of updating the target computing device with another snapshot of the recovery computing device, the target computing device can be updated with the difference between the most recent snapshot of the recovery computing device and the snapshot that was lastly used to update the target computing device. This trickling process can continue until the target computing device takes over the computer functions of the recovery computing device. At this point, the target computing device can be made to replace the protected computing device. The trickling mechanism can make the last step of the replacement faster compared to loading a full snapshot of the recovery computing device because the compute, read/write, and transmission requirements are less when updating changes between snapshots rather than creating and applying full snapshots. In some embodiments, the downtime to enabling the target computing device to take on the functions of the recovery computing device or protected computing device can be limited to a single reboot of the target computing device. Also, the trickling system and method can make the process more robust because a single final snapshot could fail, and the process could require building another complete snapshot rather than creating and sending changes between snapshots.

According to some embodiments, the target computing device may not take over the computer functions of the protected computing device. Rather, the target computing device can be provisioned for testing. For example, while the protected computing device continues to perform its computer functions, the target computing device can be used to test BCDR scenarios.

According to some embodiments, the systems and methods described herein are not limited to uses in BCDR scenarios. For example, the target computing device can be used to test software (e.g., new software, software upgrades, system patches) before installing the software on the protected computing device. As another example, the target computing device can be maintained as a backup in case the protected computing device fails. In some embodiments, the recovery computing device can perform the operations described in the previous two examples, in place of the target computing device. In this case, the target computing device may not be provisioned, and only the protected computing device and the recovery computing device are maintained. In some embodiments, the recovery computing device can be used to run an old, default, or different operating system image to access old software and data, and/or to run software or access data that requires a particular operating system image, while the target computing device is being used.

FIG. 1A shows a block diagram illustrating example aspects of a system 100 that utilizes the disclosed systems and methods. The system 100 can include a protected computing device 101, a business continuity and disaster recovery system 110, and a target computing device 103. The business continuity and disaster recovery system 110 can include snapshot storage 104 and a recovery computing device 102. The system 100 can further include a router 106, offsite storage 105, and/or one or more client computers 108a-108e.

According to some embodiments, the protected computing device 101 can provide computer functions, such as server functions to the client computers 108a-108e. For example, the protected computing device can host a server, such as a database server, an email server or a file server, which can be accessed by one or more of the client computers 108a-108e. In some embodiments, some or all of the protected computing device 101, the recovery computing device 102, the target computing device 103, the snapshot storage 104, and the client computers 108a-108e can exist within a local area network (LAN). Within the LAN, for example, the client computers 108a-108e can access the protected computing device 101, the recovery computing device 102, and/or the target computing device 103. In some embodiments, one or more of the protected computing device 101, the recovery computing device 102, the target computing device 103, and the client computers 108a-108e can exist outside the LAN. For example, the client computer 108a can exist outside the LAN. In this case, the client computer 108a can access the devices within the LAN via an outside network, such as the Internet.

According to some embodiments, snapshots captured by the protected computing device 101, the recovery computing device 102, and/or the target computing device 103 can be stored in the snapshot storage 104. The data at the snapshot storage 104 can also be transmitted to the offsite storage 105. This can advantageously provide further protection of the user data. In some embodiments, the snapshot storage 104 can be located locally at the user site, while the offsite storage 105 can be located outside the user site. For example, the offsite storage 105 can be located in a building, a city, and/or a country that is different from where the snapshot storage 104 is located. By locating the offsite storage 105 physically separate from the snapshot storage 104, the offsite storage 105 can be protected from the same risk as the snapshot storage 104. In some embodiments, the offsite storage 105 can be outside of the LAN of the snapshot storage 104. In this case, snapshots from the snapshot storage 104 can be transmitted to the offsite storage 105 via the Internet. In some embodiments, the router 106 can direct one or more snapshots from the snapshot storage 104 to the offsite storage 105. In some embodiments, snapshots from the snapshot storage 104 can be transmitted physically to the offsite storage 105. For example, snapshots from the snapshot storage 104 can be copied to physical media (e.g., a tape, optical media, Universal Serial Bus (USB) drives, and/or any other suitable portable media), which can then be transported to the offsite storage 105 for storage. In some embodiments, data within the system 100 can be moved using an intranet, the Internet, and/or any other suitable networking mechanism.

According to some embodiments, each of the computing devices in the system 100 can be a physical machine, a virtual machine (VM), a hybrid machine, and/or any other suitable type of machine. For example, the protected computing device 101 can be a physical machine (e.g., a physical machine running as a server), the recovery computing device 102 can be a VM (e.g., a VM run by a hypervisor), and the target computing device 103 can be a physical machine (e.g., a physical machine upon which a bare metal restore is run using a trickling process described herein).

According to some embodiments, the snapshot storage 104 can store snapshots in a Z File System (ZFS) chain and/or any other suitable form for storing snapshots. The ZFS chain can store data and references to data. For example, assume that the system takes a first snapshot for data blocks A and B at time 0, and a second snapshot for data blocks A, B and C at time 1. For the first snapshot, the snapshot storage 104 can store data at the data blocks A and B as part of the ZFS chain. For the second snapshot, the snapshot storage 104 can store references to the data at the data blocks A and B, as well as the data at the data block C, as part of the ZFS chain. In some embodiments, other snapshotting file systems and mechanisms can be used to capture and store any snapshots, including crash-consistent and finalization snapshots, discussed herein. Other file systems and mechanisms for snapshotting can include or relate to Hammer, ReFS, Btrfs, Write Anywhere File Layout (WAFL), fossil, ODS-5, Unix File System 2 (UFSs), Volume Shadow-copying Service (VSS), Shadow Copy, Melio FS, Novell Storage Services (NSS) file system, file systems of EMC's Isilon OneFS clustered storage platform, Oracle Cluster File System 2 (OCFS2), Journaled File System 2 (JFS2), and/or any other suitable file system or mechanism for snapshotting.

While the protected computing device 101, the recovery computing device 102, and the target computing device 103 can exist in the system 100 at the same time, this is not required. For example, until the recovery computing device 102 or the target computing device 103 is provisioned, it may not exist in the system 100. As another example, when the recovery computing device 102 or the target computing device 103 takes over the computer functions of the protected computing device 101, the user or system can decide to deprovision or remove the protected computing device 101, at which point the protected computing device 101 would no longer exist in the system 100.

According to some embodiments, the protected computing device 101 is not limited to a sever that provides computer functions to the client computers 108a-108e. For example, one or more of the client computers 108a-108e can be the protected computing device. In some embodiments, the system 100 can support any number of protected computing devices, recovery computing devices, target computing devices, and the client computers.

Figure 1B:
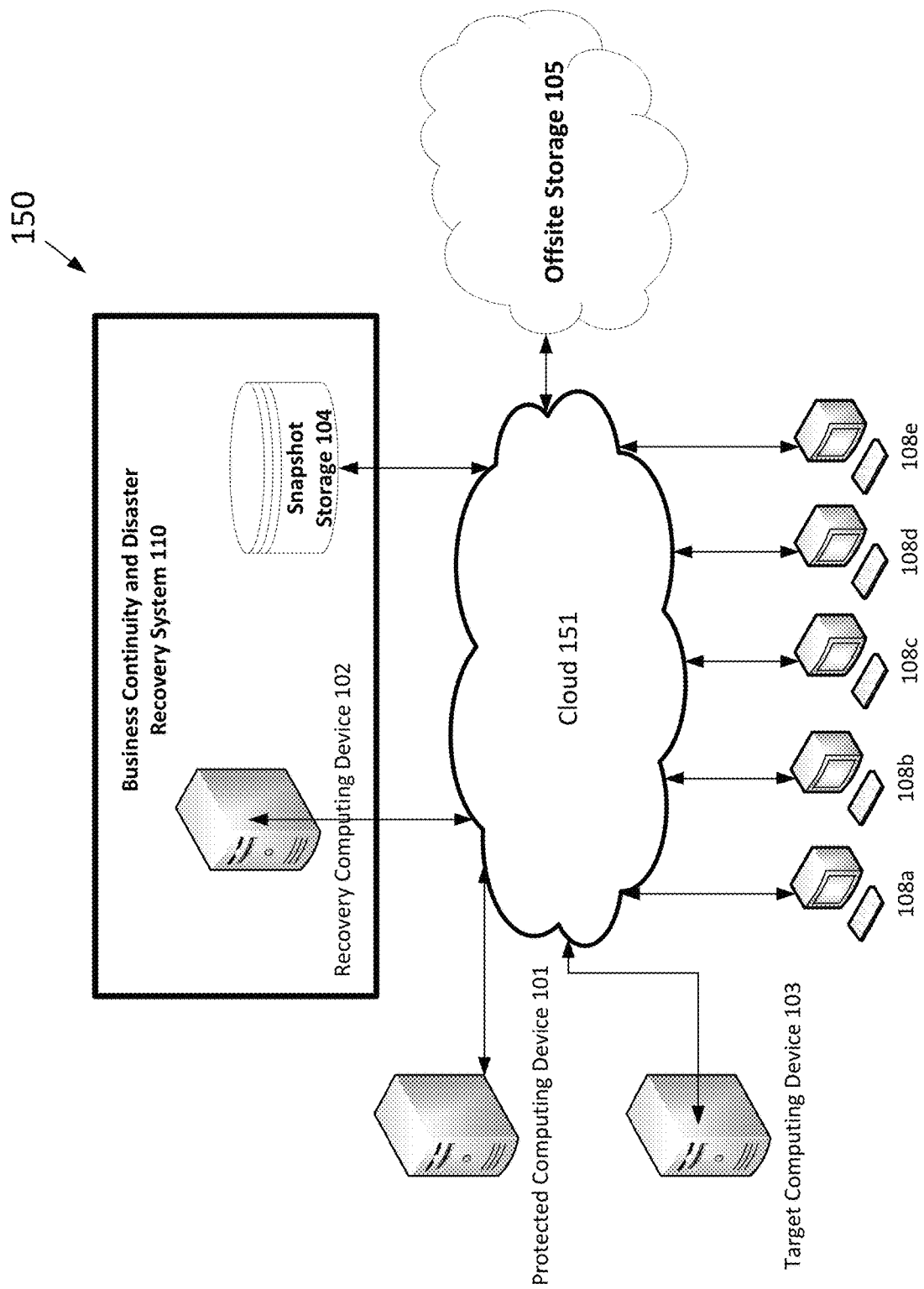
FIG. 1B shows a block diagram illustrating example aspects of a system in accordance with embodiments of the present disclosure.

FIG. 1B shows a block diagram illustrating example aspects of a system 150 that utilizes the disclosed systems and methods. The system 150 can include a protected computing device 101, a business continuity and disaster recovery system 110, and a target computing device 103. The business continuity and disaster recovery system 110 can include a recovery computing device 102 and snapshot storage 104. The system 150 can further include offsite storage 105, one or more client computers 108a-108e, and/or a cloud 151.

According to some embodiments, some or all of the components in the system 150 can communicate with each other via the cloud 151. In some embodiments, the cloud 151 can represent a network that is outside a LAN. The cloud can, for example, be the Internet. In some embodiments, different devices can communicate with each other via the cloud 151 using a virtual private network (VPN) over the Internet. For example, the protected computing device 101 can transmit its snapshots to the snapshot storage 104 over the Internet. In some embodiments, the recovery computing device 102 and the snapshot storage 104 can form the BCDR system 110 even if they are not within the same LAN. In some embodiments, a router (not shown) can direct one or more snapshots from the snapshot storage 104 to the offsite storage 105.

While the system 150 can be architecturally different from the system 100 (FIG. 1A), the same functions as described with respect to the system 100 can be provided by the system 150. Moreover, components of the system 150 can provide functions that are similar to the functions of the corresponding components of the system 100 with the same reference numerals.

Figure 2:
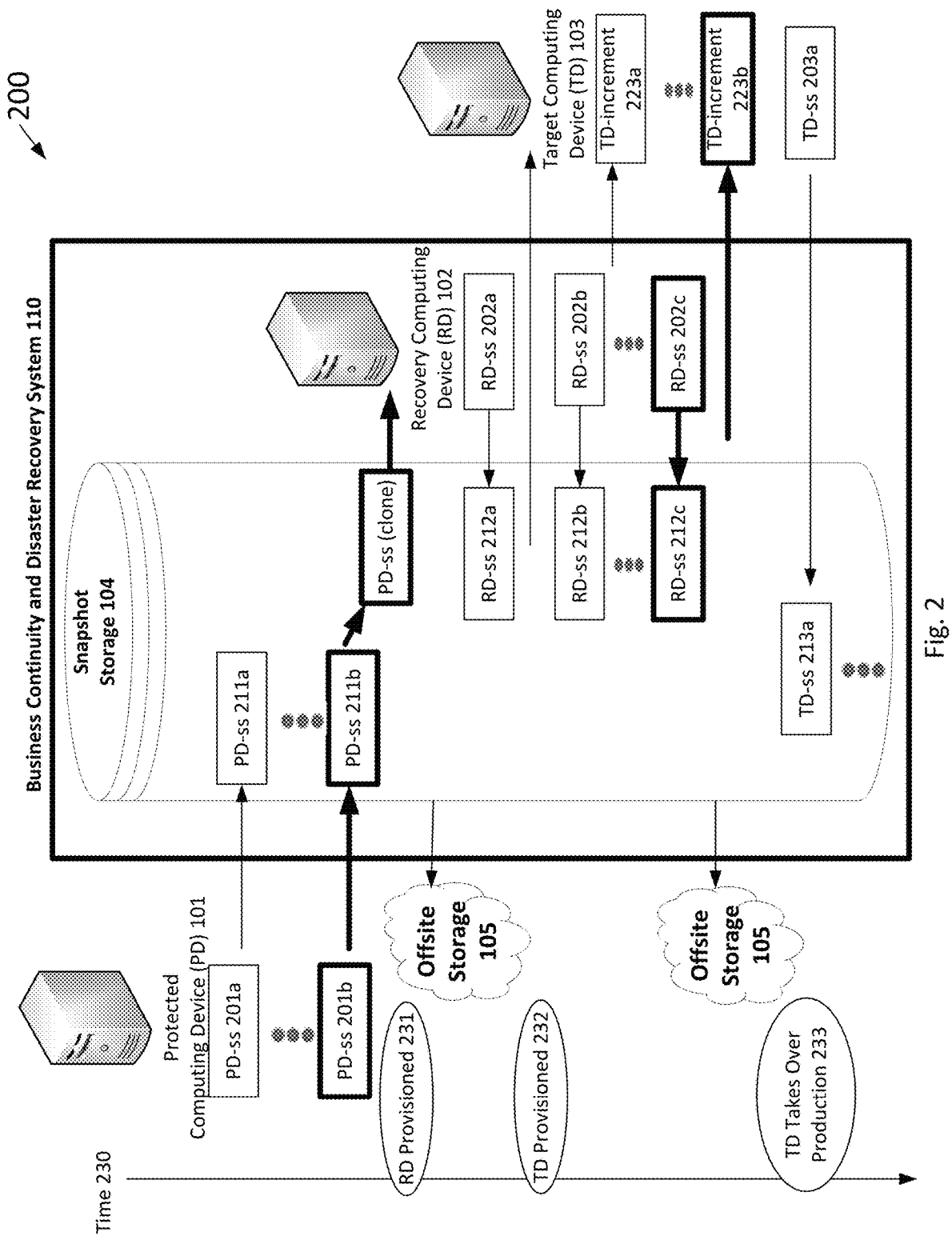
FIG. 2 shows an activity diagram that shows interactions between various components of a system in accordance with embodiments of the present disclosure.

FIG. 2 shows an activity diagram 200 that shows interactions between various components of the system 100 (FIG. 1). Actions described in the activity diagram 200 are shown relative to the progression of time 230.

According to some embodiments, the activity diagram 200 can include the protected computing device (PD) 101, the recovery computing device (RD) 102, the target computing device (TD) 103, and the snapshot storage 104, all of which can be the same as those described in reference to FIG. 1.

According to some embodiments, the PD 101 can capture a snapshot (PD-ss) 201a. In some embodiments, the PD-ss 201a can be the first snapshot for the PD 101. In other embodiments, the PD 101 could have captured one or more other snapshots previous to the capture of PD-ss 201a. In some embodiments, the PD 101 can capture a snapshot automatically. In some embodiments, a user (e.g., an administrator) or a system can configure one or more backup settings that can include how the PD 101 captures snapshots. The PD 101 can be set to capture snapshots automatically based on a schedule and/or on an event. For example, the PD 101 can be scheduled to capture a snapshot every day of the week at 11 pm. Short time or varied time intervals can be used for capturing snapshots, for example every 10 minutes during times of heavy usage and hourly or longer at times of low usage. As another example, the PD 101 can be set to capture a snapshot at times of typical low usage. Yet in another example, the PD 101 can be set to capture a snapshot before installing a system update. In some embodiments, a user (e.g., an administrator) can capture a snapshot of the PD 101—for example, by manually executing a command. In some embodiments, a snapshot can be captured based on various events (e.g., when the user initiates program installation; when the user initiates a reboot/shutdown of the PD 101).

After the PD 101 captures the PD-ss 201a, the PD 101 can transmit the PD-ss 201a to the snapshot storage 104. The snapshot storage 104 can store the PD-ss 201a as PD-ss 211a. Over time, the PD 101 can continue to capture one or more snapshots, including a PD-ss 201b. Some or all of these snapshots can be transmitted to and stored at, the snapshot storage 104. For example, the PD-ss 201b can be stored at the snapshot storage 104 as a PD-ss 211b. In some embodiments, after a snapshot is transmitted to the snapshot storage 104, the PD 101 can remove the snapshot. In some embodiments, the PD 101 can keep one or more snapshots for a predetermined period of time and/or until they are removed manually.

At some point in time 230, a user or a system (e.g., the BCDR system 110) can decide to provision the RD 102. For example, the user can decide to provision the RD 102 when the user suspects system instability in the PD 101, wants to shut down the PD 101 for servicing, and/or for any other suitable reason or purpose. As another example, the system can decide to provision the RD 102 when the system decides to shut down the PD 101 for servicing, determines that the PD 101 has been compromised or crashed, and/or for any other suitable reason or purpose.

According to some embodiments, any of the snapshots PD-ss can be selected for provisioning the RD 102. In some embodiments, the most recent PD-ss (e.g., PD-ss 211b) is selected for provisioning the RD 102. In some embodiments snapshots can be readable, but not writable, and the selected snapshot is first cloned to a suitable form and deployed to the RD 102 for provisioning. For example, the PD-ss 211b is first cloned as PD-ss (clone), which in turn is used for provisioning the RD 102. In other embodiments, the cloning may not be necessary in the process of deploying a snapshot. In some embodiments, the backup settings of the PD 101 can be copied to the RD 102. The backup settings can include information, such as the backup schedule and the off-siting schedule. Based on the copied backup settings, the RD 102 can capture its snapshots in the same way (or similarly) as the process implemented by the PD 101 to capture its snapshots.

According to some embodiments, after the RD 102 has been provisioned (time 231), the PD 101 can stop taking further snapshots. In some embodiments, after the RD 102 has been provisioned, the RD 102 can take on the server functions that PD 101 was providing to the client devices 108a-108e. In embodiments where a client device 108 was the protected device PD 101, the RD 102 can take on the functions that the client device 108 was providing. According to some embodiments, the RD 102 can take one or more RD snapshots RD-ss 202a-202c. The RD-ss 202a-202c can be transmitted to the snapshot storage 104, which can store them as RD-ss 212a-212c. In some embodiments, the RD 102 can be a virtual machine (VM), which can be a guest machine of a hypervisor running on a host computer. Within this operating system platform, the RD-ss 202a-202c and RD-ss 212a-212c, respectively, can be the same entities existing on the host computer. For these embodiments, the snapshots RD-ss are referred to by different numbers (i.e., 202a-202c and 212a-212c) to aid the description by indicating capture and store concepts, while operationally, the capture and store can be performed as one function. In some embodiments, a hypervisor can enable multiple virtual machines of different operating systems (e.g., Windows, Unix, Linux, macOS, iOS, etc.) to be on the same computer (i.e., the host machine).

At some point in time, the user or the system can decide to provision the TD 103. In some embodiments, the TD 103 can be provisioned using the most recent snapshot of the RD 102 that is available in the snapshot storage 104. For example, if the TD 103 is decided to be provisioned between when the RD-ss 202a is captured and when the RD-ss 202b is captured, and there is no other RD-ss in-between, then the TD 103 can be provisioned using the RD-ss 212a. The RD-ss 212a can include data blocks that represent the operating system and files of the RD 102.

As the TD 103 is being provisioned or after the TD 103 has been provisioned (time 232), the RD 102 can perform its normal operations (e.g., providing the computer functions of the PD 101 to a client computing device(s), capturing a snapshot). Thus, the data at the RD 102 can change during this time. In some embodiments, the TD 103 can be incrementally updated with the data changes at the RD 102. After the RD 102 has taken a snapshot RD-ss 202b, the RD 102 can determine the differences between the RD-ss 202a and the RD-ss 202b (or equivalently RD-ss 212a and the RD-ss 212b). These differences (represented as TD-increment 223a) can be converted to write commands that can be executed on the TD 103. In some embodiments, the write commands can be executed at the RD 102. For example, the RD 102 can use a zsender tool to generate the differences between the RD-ss 202a and the RD-ss 202b. The zsender tool can then convert the differences to write commands. These write commands can be executed on a file system of the TD 103 that has been mounted at the RD 102.

According to some embodiments, as the RD 102 continues to capture more snapshots, it can continue to incrementally update the TD 103 until the TD 103 takes over the computer functions of the RD 102. When the TD 103 is instructed to take over the computer functions of the RD 102, the RD 102 can capture a final snapshot RD-ss 202c. The snapshot storage 104 can store the RD-ss 202c as RD-ss 212c. The TD 103 can then be incrementally updated based on the RD-ss 212c. In some embodiments, after the TD 103 has been provisioned, the TD 103 can take on the server functions that RD 102 was providing to the client devices 108a-108e. In some embodiments, before the TD 103 takes over the computer functions of the RD 102, the TD 103 can be rebooted. In some embodiments, the TD 103 can also execute a device independent restoring process before rebooting. A device independent restoring process can enable restoring a computer system volume to a different virtual or physical environment. For example, the device independent restoring process can enable the TD 103 to be restored successfully based on a computer system volume from the RD 102. In some embodiments, this process can include detecting and loading drivers that are necessary to successfully boot the restored system volume in the TD 103. In some embodiments, this process can include removing drivers that are not needed in the TD 103.

The TD 103 can take over the computer functions of the RD 102 at time 233. According to some embodiments, after the TD 103 takes over the computer functions of the RD 102, the RD 102 can stop taking snapshots. The RD 102 can also be deprovisioned. In some embodiments, the backup settings of the RD 102 can be copied to the TD 103. The backup settings can include information, such as the backup schedule and the off-siting schedule. Based on the copied backup settings, the TD 103 can capture its snapshots in the same way (or similarly) as the process implemented by the RD 102 to capture its snapshots. In some embodiments, the TD 103 can start capturing one or more snapshots, including TD-ss 203a. Some or all of the snapshots from the TD 103 can be stored in the snapshot storage 104 (e.g., TD-ss 203a being stored as TD-ss 213a). In some embodiments, the TD 103 can itself become a protected computing device like the PD 101.

According to some embodiments, each of the snapshots can be either a crash-consistent snapshot or a finalization snapshot. The descriptions of these different snapshot types are explained below in reference to FIGS. 4A-4B. In some embodiments, all the snapshots in a chain are crash-consistent snapshots, including the last snapshot. In other embodiments, all the snapshots in a chain are crash-consistent snapshots, except for the last snapshot, which is a finalization snapshot. For example, the PD can capture crash-consistent snapshots for all of its snapshots from the PD-ss 201a up to, but not including, the PD-ss 201b, which itself is a finalization snapshot. Similarly, the RD can capture crash-consistent snapshots for all of its snapshots from RD-ss 202a up to, but not including, the RD-ss 202c, which itself is a finalization snapshot. In some embodiments, the bolded boxes (i.e., PD-ss 201b, PD-ss 211b, PD-ss (clone), RD-ss 202c, RD-ss 212c, and TD-increment 223b) can represent the path in which the data from the finalization snapshots flow.

Figure 3:
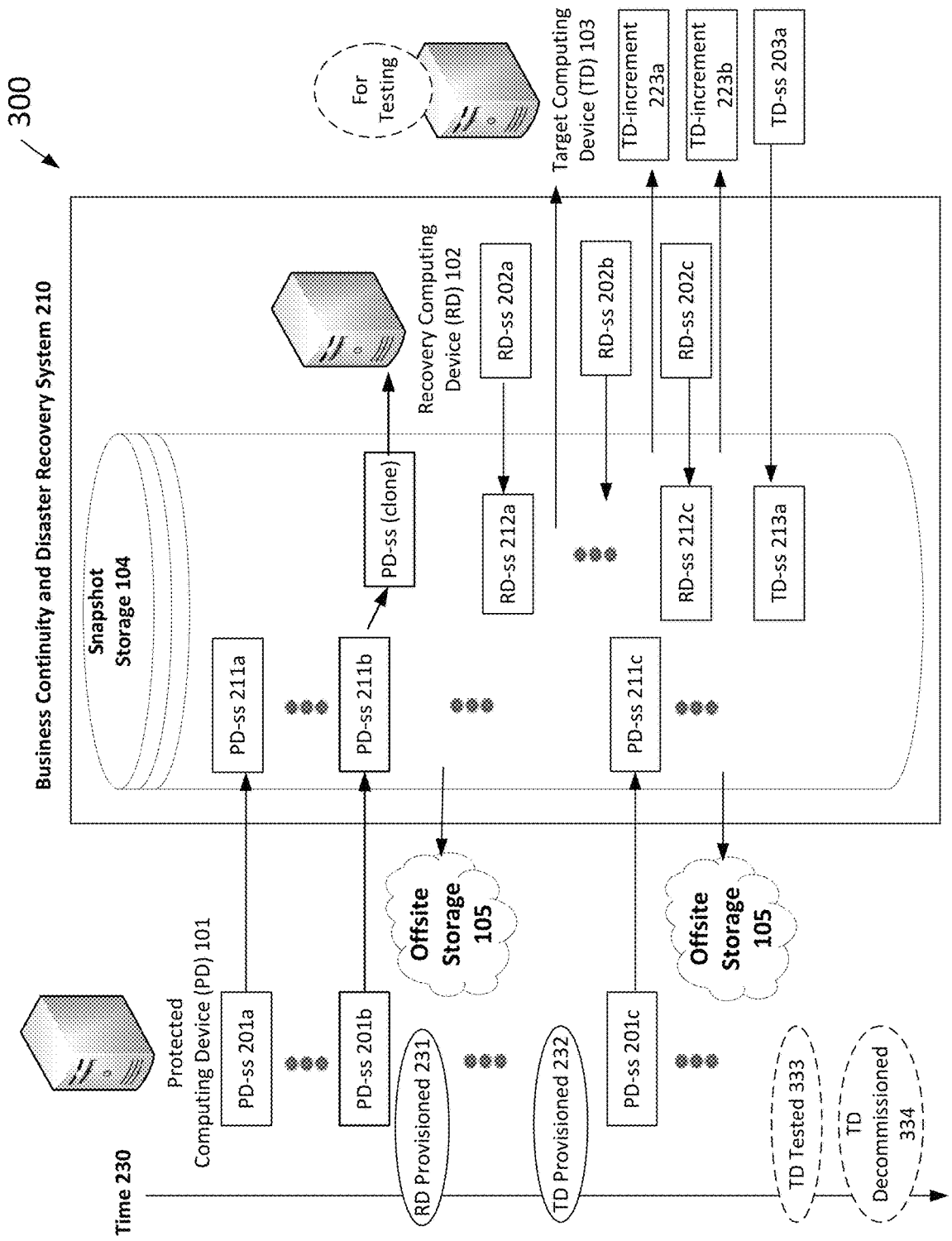
FIG. 3 shows an activity diagram that shows interactions between various components of a system in accordance with embodiments of the present disclosure.

FIG. 3 shows an activity diagram 300 that shows interactions between various components of the system 100 (FIG. 1). The components and the activities that are the same as those in the system 200 (FIG. 2) have been labelled with the same reference numerals. Thus, the description below for FIG. 3 focuses on the differences between the system 200 and the system 300.

According to some embodiments, the PD 101 of the system 300 can continue to provide its computer functions to the client computing devices 108a-e (FIG. 1) and capture snapshots, even after the RD has been provisioned at time 231 and after the TD has been provisioned at the time 232. In some of these embodiments, even if the RD 102 or TD 103 has been provisioned, the PD 101 can still provide computer functions to the client devices 108a-e. This can be useful for maintaining the PD 101 as the production server, while using the RD 102 and the TD 103 as testing servers. For example, the RD 102 and the TD 103 can be used to test various BCDR scenarios to ensure that the system is prepared for a disaster that could impact the PD 101. As another example, the RD 102 or the TD 103 can be used for testing new software or new settings (e.g., a new operating system, a system update, a new application, a new hardware or system setting, and/or any other suitable testable aspect of a computing device) to ensure that any potential changes to the PD 101 are tested before deploying to the PD 101. The RD 102 or the TD 103 can also be used to test an old snapshot of the PD 101 for different purposes (e.g., debugging). Yet in another example, the user may just want to maintain the RD 102 as a precautionary measure. According to some embodiments, after the TD 103 has been tested at time 333, the TD can be deprovisioned or decommissioned (334). Similarly, the RD 102 can also be deprovisioned or decommissioned.

Although FIGS. 2 and 3 have been described with three types of machines—the PD 101, the RD 102, and the TD 103, the systems 200 and 300 can operate with more or fewer types of machines. For example, a system can have only the PD 101 and the TD 103. In this case, incremental updates between the PD's snapshots can be trickled to the TD 103. As another example, a system can have the PD 101, the RD 102, the TD 103, and a fourth computing device. In this case, incremental updated between snapshots of the PD 101, the RD 102, or the TD 103 can be trickled to the fourth computing device. While each computing device and storage system in FIGS. 2 and 3 is shown as a single machine, it can comprise more than one machine that may or may not reside in the same physical space.

According to some embodiments, the disclosed systems and methods can support various types of snapshots, including a file-based snapshot and a block-based snapshot that determine how the underlying data blocks are backed up; and a crash-consistent snapshot and a finalization snapshot that determine how the snapshot is captured.

Figure 4A:
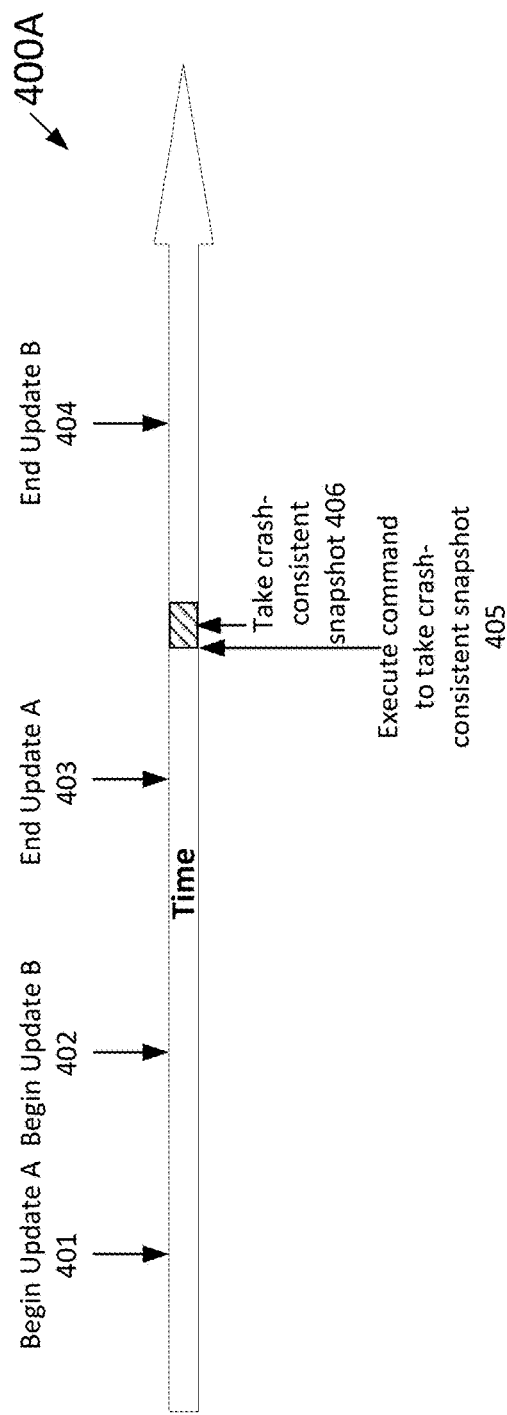
FIG. 4A illustrates a process of capturing a crash-consistent snapshot.

FIG. 4A illustrates a process 400A of capturing a crash-consistent snapshot. At time 401, an update to A (e.g., File A or data block A) begins to be made. At time 402, an update to B (e.g., File B or data block B) begins to be made. At time 403, the update to A ends. At time 405, a command is executed to take a crash-consistent snapshot. During time 406, the crash-consistent snapshot is taken. At time 404, the update to B ends. Thus, according to the process 400A, the crash-consistent snapshot captures the update to A but only part of the update to B.

Figure 4B:
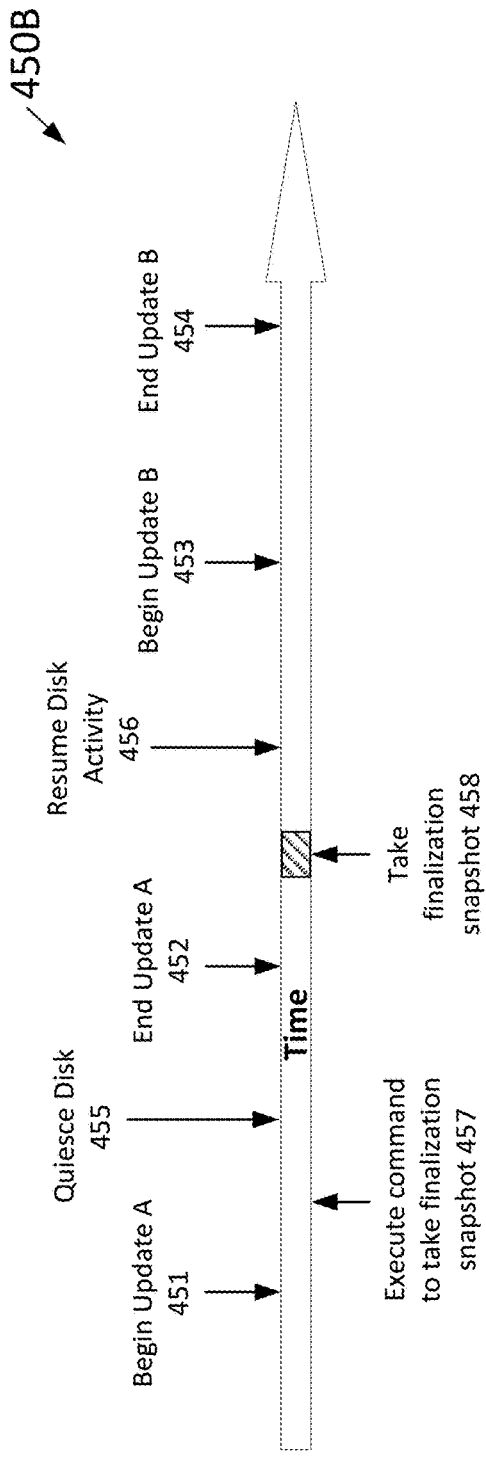
FIG. 4B illustrates a process of capturing a finalization snapshot.

FIG. 4B illustrates a process 450B of capturing a finalization snapshot. At time 451, an update to A (e.g., File A or data block A) begins to be made. At time 457, a command to take a finalization snapshot is executed. At time 455, the disk is quiesced. The quiescing process can include one or more operations, including preparing the disk for backup by flushing any outstanding writes in the buffer. The quiescing process can be performed by a file system in a source computer. It can involve bringing the on-disk data of the source computer (whether physical or virtual) into a state suitable for backups. The quiescing of a file system can also involve pausing and/or altering the state of running processes on the source computer—particularly, those that might modify information stored on disk during a backup, to guarantee a consistent and usable backup. The quiescing process can also include operations, such as flushing dirty buffers from the operating system's in-memory cache to disk. At time 452, the update to A ends. During time 458, the finalization snapshot is taken. At time 456, the disk activity is resumed. At time 453, an update to B (e.g., File B or data block B) begins. At time 454, the update to B ends. Thus, according to the process 450B, the finalization snapshot captures the update to A but not the update to B, which is queued and delayed until disk activity is resumed.

Figure 5:
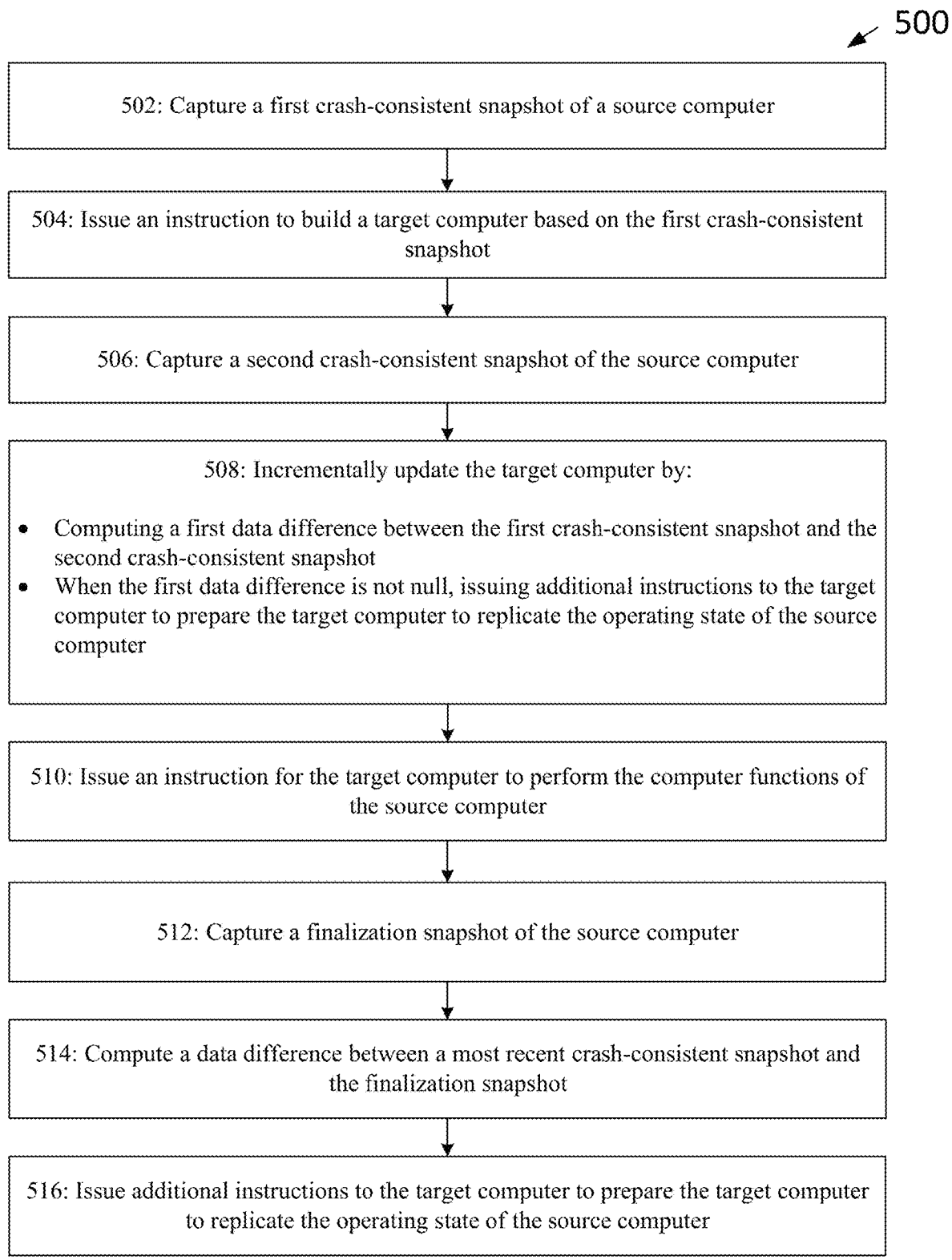
FIG. 5 shows a flowchart depicting an exemplary process for replicating a set of data blocks from a source computer to a target computer in accordance with embodiments of the present disclosure.

FIG. 5 shows a flowchart depicting an exemplary process 500 for replicating a set of data blocks from a source computer to a target computer while the source computer is in operation and contents of the set of data blocks are changing. In some embodiments, the source computer is the protected computing device 101 (FIG. 1), while the target computer is the target computing device 103 (FIG. 1). In other embodiments, the source computer is the recovery computing device 102 (FIG. 1), while the target computer is the target computing device 103 (FIG. 1). In some embodiments, the process 500 can be modified by, for example, having steps combined, divided, rearranged, changed, added, and/or removed. In some embodiments, the process 500 can be performed by one or more modules (e.g., the snapshot module 750 (FIG. 7)).

At step 502, a first crash-consistent snapshot of the source computer that performs computer functions can be captured. In some embodiments, the computer functions can be provided for at least one client computer. In some embodiments, the computer functions are the functions of a client computer, and the source computer is the client computer. The client computer can be one of the client computers 108a-108e (FIG. 1). In some embodiments, the first crash-consistent snapshot can include contents of the set of data blocks at the source computer at a first point in time. In some embodiments, the contents at the first point in time can include data that implements an operating system running on the source computer at the first point in time and files that are stored on the source computer at the first point in time. In some embodiments, the operating system can include a file system. The file system can refer to code that implements the framework within which files are stored, such as a New Technology File System (NTFS), a File Allocation Table (FAT), and/or any other type of file system. In some embodiments, the first crash-consistent snapshot can be stored in a Z File System (ZFS) chain and/or any other suitable form for storing snapshots as described above.

At step 504, an instruction to build the target computer based on the first crash-consistent snapshot can be issued such that the target computer can be prepared to take over the computer functions of the source computer and replicate an operating state of the source computer at the first point in time. In some embodiments, a determination can be made by, for example a user or the source computer itself, as to whether the source computer is operating within desired parameters. The instruction to build the target computer based on the first crash-consistent snapshot can be issued when the source computer is determined to not be operating within the desired parameters. In some embodiments, the first crash-consistent snapshot can be the most recent crash-consistent snapshot of the source computer when the instruction to build the target computer based on the first crash-consistent snapshot is issued.

At step 506, a second crash-consistent snapshot of the source computer can be captured. In some embodiments, the second crash-consistent snapshot can include contents of the set of data blocks at the source computer at a second point in time. In some embodiments, the contents at the second point in time can include data that implements an operating system running on the source computer at the second point in time and files that are stored on the source computer at the second point in time. In some embodiments, the second crash-consistent snapshot can be stored in the same Z File System (ZFS) chain (and/or any other suitable form for storing snapshots) as the first crash-consistent snapshot.

At step 508, the target computer can be incrementally updated by: (1) first computing a first data difference between the first crash-consistent snapshot and the second crash-consistent snapshot; and (2) when the first data difference is not null, issuing one or more first additional instructions, based on the first data difference, to the target computer to prepare the target computer to replicate the operating state of the source computer at the second point in time and to take over the computer functions of the source computer. In some embodiments, the second crash-consistent snapshot can be the most recent crash-consistent snapshot of the source computer when the first data difference between the first crash-consistent snapshot and the second crash-consistent snapshot is computed. In some embodiments, the one or more first additional instructions can include one or more write commands corresponding to the first data difference for the target computer. In some embodiments, the one or more write commands can be executed, at the source computer, on a file system of the target computer that is mounted at the source computer.

At step 510, an instruction is issued for the target computer to perform the computer functions of the source computer. In some embodiments, the instruction to the target computer to perform the computer functions of the source computer can be issued based on a user-initiated event or a computer-initiated event.

At step 512, a finalization snapshot of the source computer can be captured. In some embodiments, the finalization snapshot can include contents of the set of data blocks at the source computer at a last point in time. In some embodiments, the contents at the last point in time can include data that implements an operating system running on the source computer at the last point in time and files that are stored on the source computer at the last point in time. In some embodiments, one or more other crash-consistent snapshots of the source computer can be captured between the second point in time and the last point in time.

At step 514, a last data difference between the most recent crash-consistent snapshot and the finalization snapshot can be computed. In some embodiments, the last data difference can be used to prepare the target computer to take over the computer functions of the source computer and replicate an operating state of the source computer to the target computer.

At step 516, one or more final additional instructions can be issued, based on the last data difference, to the target computer to prepare the target computer to replicate the operating state of the source computer at the last point in time and to take over the computer functions of the source computer. In some embodiments, upon receiving the instruction to perform the computer functions of the source computer, the target computer can synchronize the file system of the target computer with the file system of the source computer and reboot. The target computer can also perform verification (e.g., to verify functionality of the target computer, data integrity, and/or any other suitable verifiable attribute). In some embodiments, when the target computer performs the computer functions of the source computer, the target computer can take on a time-incremental schedule that is used by the source computer to capture one or more crash-consistent snapshots. In some embodiments, the target computer can be deprovisioned after testing. For example, after verifying functionality and/or data integrity of the target computer, the target computer can be deprovisioned.

According to some embodiments, when the source computer is the recovery computing device 102 (FIG. 1), a snapshot of a protected computer can be captured, and the source computer can be provisioned based on the snapshot of the protected computer—before capturing the first crash-consistent snapshot of the source computer. In some embodiments, the snapshot of the protected computer can be a finalization snapshot. In some embodiments, the protected computer is a physical machine, and the source computer is a VM. In some embodiments, the source computer can be provisioned based on a suspected malfunction, decommission, upgrade, and/or maintenance process of the protected computer.

According to some embodiments, after the target computer is instructed to perform the computer functions of the source computer, the operation of the source computer can be maintained. In some embodiments, the source computer can continue to take one or more crash-consistent snapshots into a first plurality of crash-consistent snapshots, while the target computer can take one or more crash-consistent snapshots into a second plurality of snapshots. In some embodiments, the first plurality of snapshots can be a first ZFS chain of snapshots, and the second plurality of snapshots can be a second ZFS chain of snapshots.

According to some embodiments, the finalization snapshot can be captured, while the source computer is quiesced. In some embodiments, the first crash-consistent snapshot and the second crash-consistent snapshot can both be taken, while the source computer is not quiesced. According to some embodiments, the source computer can be a physical machine, a VM, a hybrid machine, and/or any other suitable machine type.

Figure 6:
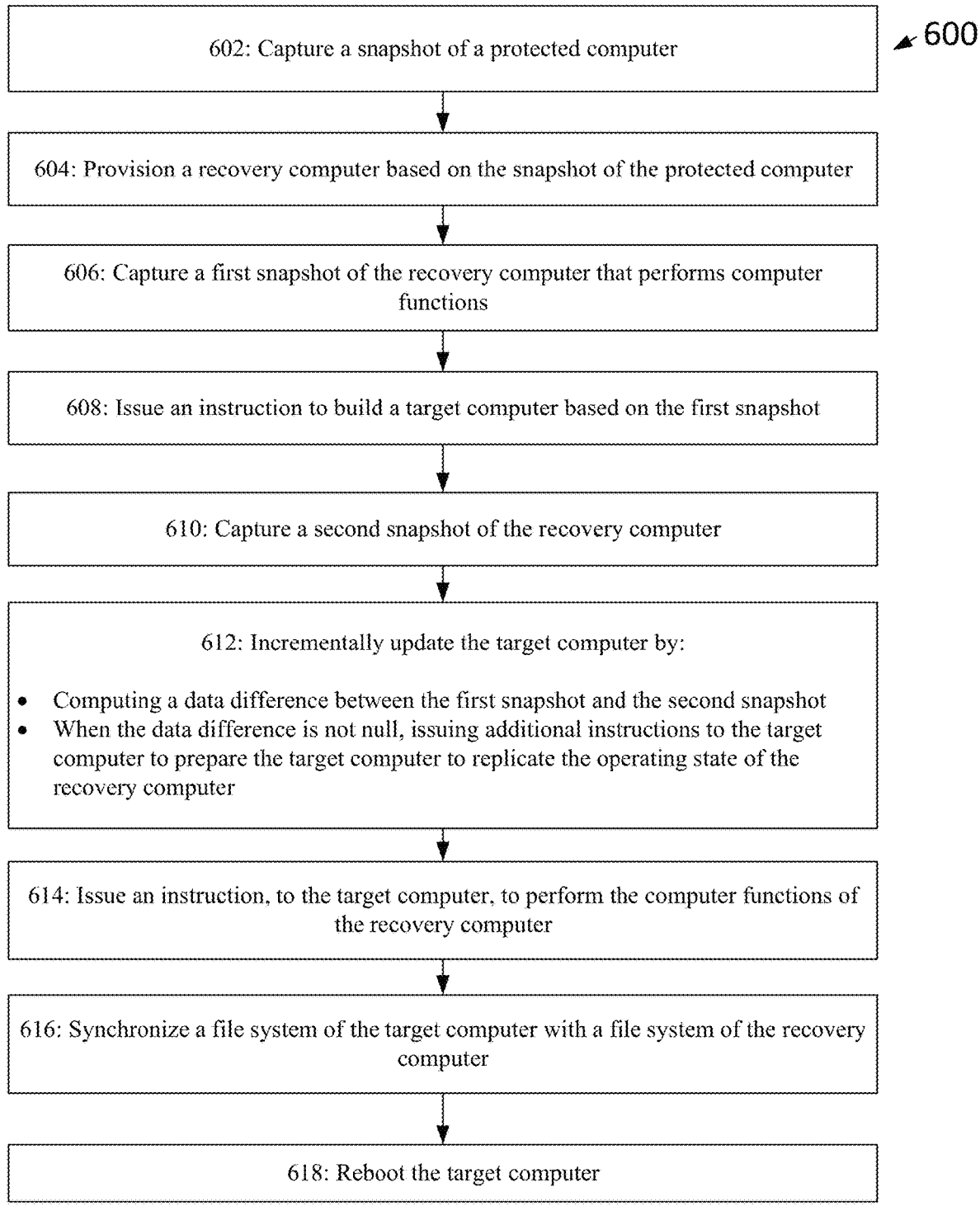
FIG. 6 shows a flowchart depicting an exemplary process for replicating a set of data blocks from a recovery computer to a target computer in accordance with embodiments of the present disclosure

FIG. 6 shows a flowchart depicting an exemplary process 600 for replicating a set of data blocks from a recovery computer to a target computer while the recovery computer is in operation and contents of the set of data blocks are changing, wherein the recovery computer is built from a protected computer. In some embodiments, the recovery computer can be a physical machine, a VM machine, a hybrid machine, or any other suitable type of machine. In some embodiments, the protected computer is a physical machine, and the recovery computer is a virtual machine (VM). In some embodiments, the process 600 can be modified by, for example, having steps combined, divided, rearranged, changed, added, and/or removed. In some embodiments, the process 600 can be performed by one or more modules (e.g., the snapshot module 750 (FIG. 7)).

At step 602, a snapshot of the protected computer can be captured in a similar manner as described above for step 502. The snapshot captured at step 602, and for any other snapshot captured in process 600, can be any type of snapshot, including a crash-consistent snapshot or a finalization snapshot.

At step 604, the recovery computer can be provisioned based on the snapshot of the protected computer. In some embodiments, the recovery computer can be provisioned based on one or more conditions, such as a suspected malfunction, decommission, upgrade, test, maintenance process, and/or any other suitable event or reason associated with the protected computer.

At step 606, a first snapshot of the recovery computer that performs computer functions can be captured. In some embodiments, the first snapshot can include contents of the set of data blocks at the recovery computer at a first point in time. In some embodiments, the contents at the first point in time can include data that implements an operating system running on the recovery computer at the first point in time and files that are stored on the recovery computer at the first point in time. In some embodiments, the operating system can include a file system. In some embodiments, the first snapshot can be stored in a ZFS chain and/or any other suitable form for storing snapshots. In some embodiments, the computer functions are provided for at least one client computer. The client computer can be any of the client computers 108*a*-108*e* (FIG. 1).

At step 608, an instruction to build the target computer based on the first snapshot can be issued. In some embodiments, the first snapshot can be the most recent snapshot of the recovery computer when the instruction to build the target computer based on the first snapshot is issued. In some embodiments, the instruction can be issued such that the target computer can be prepared to take over the computer functions of the recovery computer and replicate an operating state of the recovery computer at the first point in time. In some embodiments, it can be determined whether the recovery computer is operating within desired parameters. The instruction to build the target computer based on the first snapshot can be issued when the recovery computer is determined to not be operating within the desired parameters.

At step 610, a second snapshot of the recovery computer can be captured. In some embodiments, the second snapshot can include contents of the set of data blocks at the recovery computer at a second point in time. The contents at the second point in time can include data that implements an operating system running on the recovery computer at the second point in time and files that are stored on the recovery computer at the second point in time. In some embodiments, a plurality of snapshots of the recovery computer, including the first snapshot and the second snapshot, are captured based on a time-incremental schedule of the recovery computer that is based on a time-incremental schedule of the protected computer. In some embodiments, the second snapshot can be stored in a ZFS chain (e.g., the same ZFS chain where other snapshots of the recovery computer are stored) and/or stored as any other suitable form for storing snapshots.

At step 612, the target computer can be incrementally updated by: (1) computing a data difference between the first snapshot and the second snapshot; and (2) when the data difference is not null, issuing one or more additional instructions, based on the data difference, to the target computer to prepare the target computer to replicate the operating state of the recovery computer at the second point in time and to take over the computer functions of the recovery computer. In some embodiments, the second snapshot can be the most recent snapshot of the recovery computer when the data difference between the first snapshot and the second snapshot is computed. In some embodiments, the one or more additional instructions based on the data difference can include one or more write commands corresponding to the data difference between the first snapshot and the second snapshot for the target computer. In some embodiments, the one or more write commands can be executed, at the recovery computer, on a file system of the target computer that is mounted at the recovery computer.

At step 614, an instruction, to the target computer, can be issued to perform the computer functions of the recovery computer. In some embodiments, the instruction to the target computer to perform the computer functions of the recovery computer can be issued based on at least one of a user-initiated event and a computer-initiated event.

At step 616, the target computer can synchronize a file system of the target computer with a file system of the recovery computer.

At step 618, the target computer can reboot. In some embodiments, when the target computer performs the computer functions of the recovery computer, the target computer can take on the time-incremental schedule of the recovery computer to capture one or more snapshots of the target computer. In some embodiments, after synchronizing the file system of the target computer with the file system of the recovery computer and rebooting, the target computer can be tested to verify functionality, data integrity, and/or any other suitable attribute of the target computer. After the verification, the target computer can be deprovisioned.

According to some embodiments, between steps 612 and 614, steps similar to steps 610 and 612 can be repeated any number of times for the target computer to be incrementally updated further. For example, a third snapshot of the recovery computer can be captured between steps 612 and 614. The third snapshot can include contents of the set of data blocks at the recovery computer at a third point in time. The contents at the third point in time can include data that implements an operating system running on the recovery computer at the third point in time and files that are stored on the recovery computer at the third point in time. Before step 614, the target computer can be updated incrementally by: (1) computing a second data difference between the second snapshot and the third snapshot; and (2) when the second data difference is not null, issuing one or more additional instructions, based on the second data difference, to the target computer to prepare the target computer to take over the computer functions of the recovery computer and to replicate the operating state of the recovery computer at the third point in time.

According to some embodiments, after the target computer is instructed to perform the computer functions of the recovery computer, operation of the recovery computer can be maintained. The recovery computer can continue to take one or more snapshots into a first plurality of snapshots, while the target computer can take one or more snapshots into a second plurality of snapshots. In some embodiments, the first plurality of snapshots can be a first ZFS chain of snapshots, and the second plurality of snapshots can be a second ZFS chain of snapshots.

According to some embodiments, after the target computer is instructed to perform the computer functions of the recovery computer, operation of the protected computer can be maintained. The protected computer can continue to take one or more snapshots into a first plurality of snapshots, while the target computer can take one or more snapshots into a second plurality of snapshots. In some embodiments, the first plurality of snapshots can be a first ZFS chain of snapshots, and the second plurality of snapshots can be a second ZFS chain of snapshots.

According to some embodiments, the target computer can be a repaired version of the protected computer. For example, if the protected computer has problems related to memory inconsistency, the target computer can correct the inconsistency by, for example, executing a memory management tool. As another example, if the protected computer has a virus or malware, the target computer can have the virus or malware removed. Thus, the target computer can be used to replace the protected machine that has issues.

Figure 7:
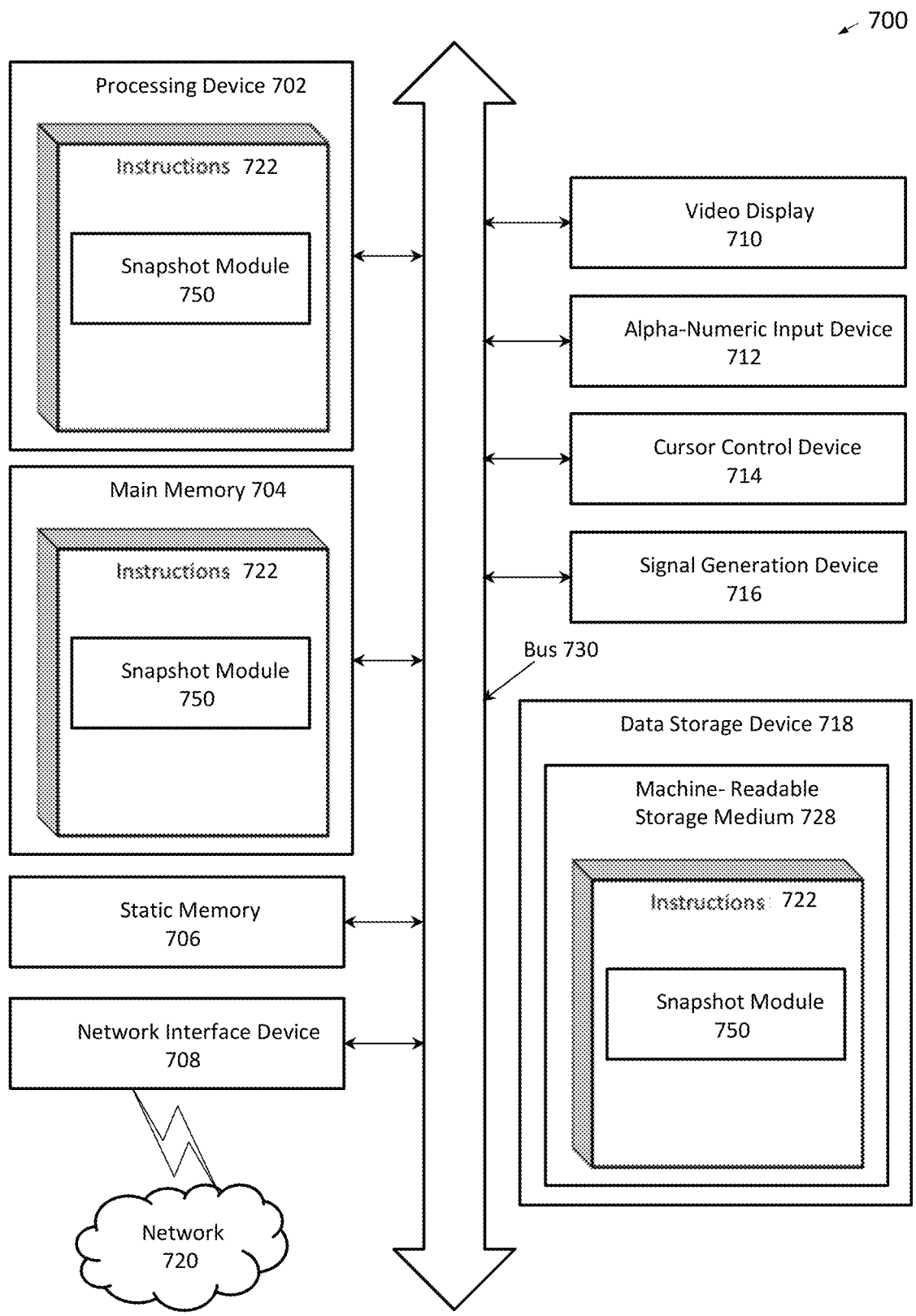
FIG. 7 illustrates an example machine of a computer system within which a set of instructions may be executed in accordance with embodiments of the present disclosure.

FIG. 7 illustrates an example machine of a computer system 700 within which a set of instructions, for causing the machine to perform any one or more of the methodologies discussed herein, may be executed. For example, client devices (e.g., 108*a-e* (FIG. 1)), protected computing devices (e.g., 101 (FIG. 1)), recovery computing devices (e.g., 102 (FIG. 1)), and/or target computing devices (e.g., 103 (FIG. 1)) may be implemented on machines similar to the computer system 700. According to various embodiments, the machine may be connected (e.g., networked) to other machines in a LAN, an intranet, an extranet, and/or the Internet. The machine may operate in the capacity of a server or a client machine in a client-server network environment, or as a peer machine in a peer-to-peer (or distributed) network environment. Any computing device or machine described herein can be a physical machine, a VM machine, a hybrid machine, or any other suitable type of machine.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" includes any collection of machines that individually or jointly execute a set (or multiple sets) of instructions to perform any one or more of the methodologies discussed herein.

The example computer system 700 includes a processing device 702, a main memory 704 (e.g., read-only memory (ROM), flash memory, dynamic random access memory (DRAM) such as synchronous DRAM (SDRAM) or rambus DRAM (RDRAM), etc.), a static memory 706 (e.g., flash memory, static random access memory (SRAM), etc.), and a data storage device 718, which communicate with each other via a bus 730.

A processing device 702 represents one or more general-purpose processing devices such as a microprocessor, a central processing unit, or the like. More particularly, the processing device 702 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. The processing device 702 may also be one or more special-purpose processing devices such as an application specific integrated circuit (ASIC), a field programmable gate array (FPGA), a digital signal processor (DSP), network processor, a graphical processing unit (GPU), or the like. The processing device 702 is configured to execute instructions 722 for performing the operations and steps discussed herein.

The computing system 700 may further include a network interface device 708. The computing system 700 also may optionally include a video display unit 710 (e.g., a liquid crystal display (LCD), Light Emitting Diode (LED) monitor, or a cathode ray tube (CRT)), an alphanumeric input device 712 (e.g., a keyboard), a cursor control device 714 (e.g., a mouse), and/or a signal generation device 716 (e.g., a speaker).

The data storage device 718 may include a machine-readable storage medium 728 (also known as a computer-readable medium) on which is stored one or more sets of instructions 722 or software embodying any one or more of the methodologies or functions described herein. The instructions 722 may also reside, completely or at least partially, within the main memory 704 and/or within the processing device 702 during execution thereof by the computer system 700, the main memory 704 and the processing device 702 also constituting machine-readable storage media.

In one implementation, the instructions 722 can include instructions for a snapshot module 750, and/or a software library containing methods that can be called by the snapshot module 750. The instructions in the snapshot module 750 and/or the software library may be used to implement processes 500 and 600, as described above in relation to FIGS. 5 and 6. While the machine-readable storage medium is shown in an example implementation to be a single medium, the term "machine-readable storage medium" includes a single medium or multiple media (e.g., a centralized or distributed database, and/or associated caches and servers) that store the one or more sets of instructions. The term "machine-readable storage medium" also includes any medium that is capable of storing or encoding a set of instructions for execution by the machine and that cause the machine to perform any one or more of the methodologies of the present disclosure. The term "machine-readable storage medium" accordingly includes, but is not limited to, solid-state memories, optical media and magnetic media.

The present disclosure also relates to an apparatus for performing the operations herein. This apparatus may be specially constructed for the intended purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general-purpose systems may be used with programs in accordance with the teachings herein, or it may prove convenient to construct a more specialized apparatus to perform the method. The structure for a variety of these systems will appear as set forth in the description below. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, implementations of the disclosure have been described with reference to specific example implementations thereof. It will be evident that various modifications may be made thereto without departing from the broader spirit and scope of implementations of the disclosure as set forth in the following claims. The specification and drawings are, accordingly, to be regarded in an illustrative sense rather than a restrictive sense.

In many instances in this disclosure, various components, including computing devices and computers, have been depicted and described as single objects. However, it is to be understood that each of those components can comprise more than a single object. For example, the recovery computing device 102 (FIG. 1) can comprise two or more physical machines that host one or more VMs.

Various other modifications, including additions and removals, can be made to the exemplary embodiments discussed without departing from the scope of the present disclosure. For example, while the embodiments described above refer to particular features, components, or particular steps, the scope of this disclosure also includes embodiments having different combinations of features, components, or steps, and embodiments that do not include all of the above described features, components, or steps.

It is to be understood that the disclosed subject matter is not limited in its application to the details of construction and to the arrangements of the components set forth in the description or illustrated in the drawings. The disclosed subject matter is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, systems, methods and media for carrying out the several purposes of the disclosed subject matter.

What is claimed is:

1. A method of replicating a set of data blocks from a source computer to a target computer while the source computer is in operation and contents of the set of data blocks are changing, the method comprising:

capturing a first crash-consistent snapshot of the source computer that performs computer functions, the first crash-consistent snapshot including contents of the set of data blocks at the source computer at a first point in time, wherein the contents at the first point in time comprise data that implements an operating system running on the source computer at the first point in time and files that are stored on the source computer at the first point in time;

issuing an instruction to build the target computer based on the first crash-consistent snapshot such that the target computer is prepared to take over the computer functions of the source computer and replicate an operating state of the source computer at the first point in time;

capturing a second crash-consistent snapshot of the source computer, the second crash-consistent snapshot including contents of the set of data blocks at the source computer at a second point in time, wherein the contents at the second point in time comprise data that implements an operating system running on the source computer at the second point in time and files that are stored on the source computer at the second point in time;

incrementally updating the target computer by:
computing a first data difference between the first crash-consistent snapshot and the second crash-consistent snapshot, and
when the first data difference is not null, issuing one or more first additional instructions, based on the first data difference, to the target computer to prepare the target computer to replicate the operating state of the source computer at the second point in time and to take over the computer functions of the source computer; and upon issuing an instruction, to the target computer, to perform the computer functions of the source computer, capturing a finalization snapshot of the source computer, the finalization snapshot including contents of the set of data blocks at the source computer at a last point in time, wherein the contents at the last point in time comprise data that implements an operating system running on the source computer at the last point in time and files that are stored on the source computer at the last point in time, computing a last data difference between a most recent crash-consistent snapshot and the finalization snapshot, and issuing one or more final additional instructions, based on the last data difference, to the target computer to prepare the target computer to replicate the operating state of the source computer at the last point in time and to take over the computer functions of the source computer, wherein the source computer is a recovery computer, and before capturing the first crash-consistent snapshot of the source computer, capturing a snapshot of a protected computer and provisioning the source computer based on the snapshot of the protected computer.

2. The method of claim 1, wherein the snapshot of the protected computer is a finalization snapshot.

3. The method of claim 1, wherein the protected computer is a physical machine and the source computer is a virtual machine (VM).

4. The method of claim 1, wherein provisioning the source computer is based on at least one of a suspected malfunction, decommission, upgrade, and maintenance process of the protected computer.

5. The method of claim 1, wherein the first crash-consistent snapshot is the most recent crash-consistent snapshot of the source computer when the instruction to build the target computer is issued based on the first crash-consistent snapshot.

6. The method of claim 1, wherein the second crash-consistent snapshot is the most recent crash-consistent snapshot of the source computer when the first data difference between the first crash-consistent snapshot and the second crash-consistent snapshot is computed.

7. The method of claim 1, wherein the second crash-consistent snapshot is the most recent crash-consistent snapshot of the source computer.

8. The method of claim 1, wherein the instruction to the target computer to perform the computer functions of the source computer is issued based on at least one of a user-initiated event and a computer-initiated event.

9. The method of claim 1, wherein when the target computer performs the computer functions of the source computer, the target computer overtakes a time-incremental schedule that is used by the source computer to capture one or more crash-consistent snapshots.

10. The method of claim 1, upon receiving the instruction to perform the computer functions of the source computer, the target computer performs:
synchronizing the file system of the target computer with the file system of the source computer;
rebooting; and
testing the target computer to verify at least one of functionality and data integrity.

11. The method of claim 1, the method further comprising determining whether the source computer is operating within desired parameters, wherein the instruction to build the target computer based on the first crash-consistent snapshot is issued when the source computer is determined to not be operating within the desired parameters.

12. A method of replicating a set of data blocks from a recovery computer to a target computer while the recovery computer is in operation and contents of the set of data blocks are changing, wherein the recovery computer is built from a protected computer, the method comprising:
capturing a snapshot of the protected computer;
provisioning the recovery computer based on the snapshot of the protected computer;
capturing a first snapshot of the recovery computer that performs computer functions, the first snapshot including contents of the set of data blocks at the recovery computer at a first point in time, wherein the contents at the first point in time comprise data that implements an operating system running on the recovery computer at the first point in time and files that are stored on the recovery computer at the first point in time;
issuing an instruction to build the target computer based on the first snapshot such that the target computer is prepared to take over the computer functions of the recovery computer and replicate an operating state of the recovery computer at the first point in time;
capturing a second snapshot of the recovery computer, the second snapshot including contents of the set of data blocks at the recovery computer at a second point in time, wherein the contents at the second point in time comprise data that implements an operating system running on the recovery computer at the second point in time and files that are stored on the recovery computer at the second point in time;
wherein a plurality of snapshots of the recovery computer, including the first snapshot and the second snapshot, are captured based on a time-incremental schedule of the recovery computer that is based on a time-incremental schedule of the protected computer;
incrementally updating the target computer by:
computing a data difference between the first snapshot and the second snapshot; and
when the data difference is not null, issuing one or more additional instructions, based on the data difference, to the target computer to prepare the target computer to replicate the operating state of the recovery computer at the second point in time and to take over the computer functions of the recovery computer; and
issuing an instruction, to the target computer, to perform the computer functions of the recovery computer, wherein the target computer, upon receiving the instruction to perform the computer functions of the recovery computer, synchronizes a file system of the target computer with a file system of the recovery computer and reboots.

13. The method of claim 12, further comprising:
capturing a third snapshot of the recovery computer, the third snapshot including contents of the set of data blocks at the recovery computer at a third point in time, wherein the contents at the third point in time comprise data that implements an operating system running on the recovery computer at the third point in time and files that are stored on the recovery computer at the third point in time; and
before issuing the instruction to the target computer to perform the computer functions of the recovery computer, further incrementally updating the target computer by:
computing a second data difference between the second snapshot and the third snapshot; and
when the second data difference is not null, issuing one or more additional instructions, based on the second data difference, to the target computer to prepare the target computer to take over the computer functions of the recovery computer and to replicate the operating state of the recovery computer at the third point in time.

14. The method of claim 12, wherein the instruction to the target computer to perform the computer functions of the recovery computer is issued based on at least one of a user-initiated event and a computer-initiated event.

15. The method of claim 12, wherein when the target computer performs the computer functions of the recovery computer, the target computer overtakes the time-incremental schedule of the recovery computer to capture one or more snapshots of the target computer.

16. The method of claim 12, wherein the protected computer is a physical machine and the recovery computer is a virtual machine (VM).

17. The method of claim 12, wherein provisioning the recovery computer is based on at least one of a suspected malfunction, decommission, upgrade, test, and maintenance process of the protected computer.

18. The method of claim 12, the method further comprising maintaining, after the target computer is instructed to perform the computer functions of the recovery computer, operation of the recovery computer, wherein the recovery computer continues to take one or more snapshots into a first plurality of snapshots, while the target computer takes one or more snapshots into a second plurality of snapshots.

19. The method of claim 12, the method further comprising maintaining, after the target computer is instructed to perform the computer functions of the recovery computer, operation of the protected computer, wherein the protected computer continues to take one or more snapshots into a first plurality of snapshots, while the target computer takes one or more snapshots into a second plurality of snapshots.

* * * * *